United States Patent
Horn

(10) Patent No.: US 10,893,075 B2
(45) Date of Patent: Jan. 12, 2021

(54) FLEXIBLE SELECTION OF SECURITY FEATURES IN MOBILE NETWORKS

(71) Applicant: NOKIA SOLUTIONS AND NETWORKS OY, Espoo (FI)

(72) Inventor: Guenther Horn, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 145 days.

(21) Appl. No.: 16/069,962

(22) PCT Filed: Jan. 13, 2017

(86) PCT No.: PCT/EP2017/050675
§ 371 (c)(1),
(2) Date: Jul. 13, 2018

(87) PCT Pub. No.: WO2017/121854
PCT Pub. Date: Jul. 20, 2017

(65) Prior Publication Data
US 2019/0028515 A1    Jan. 24, 2019

Related U.S. Application Data

(60) Provisional application No. 62/278,801, filed on Jan. 14, 2016.

(51) Int. Cl.
*H04L 29/06* (2006.01)
*H04W 12/10* (2009.01)
*H04W 12/00* (2009.01)

(52) U.S. Cl.
CPC ....... *H04L 63/205* (2013.01); *H04W 12/0013* (2019.01); *H04W 12/0017* (2019.01);
(Continued)

(58) Field of Classification Search
None
See application file for complete search history.

(56) References Cited

U.S. PATENT DOCUMENTS

| 2002/0199001 | A1* | 12/2002 | Wenocur | H04L 63/0428 709/227 |
|---|---|---|---|---|
| 2008/0076392 | A1* | 3/2008 | Khetawat | H04W 12/0401 455/411 |
| 2008/0222734 | A1* | 9/2008 | Redlich | H04L 63/02 726/26 |

(Continued)

OTHER PUBLICATIONS

Zhou, X. Q. et al. Authenticity and integrity of digital mammography images. IEEE Transactions on Medical Imaging vol. 20, Issue: 8. https://ieeexplore.ieee.org/stamp/stamp.jsp?tp=&arnumber=938246 (Year: 2001).*

(Continued)

*Primary Examiner* — Jeremiah L Avery
(74) *Attorney, Agent, or Firm* — Squire Patton Boggs (US) LLP

(57) ABSTRACT

Various communication systems may benefit from appropriate security measures. For example, mobile networks may benefit from the flexible selection of security features. A method can include receiving an attach request. The method can also include sending a response to the request. The response can include information configured to allow selection of a control plane integrity algorithm independently of a user plane integrity algorithm.

18 Claims, 4 Drawing Sheets

(52) U.S. Cl.
CPC ......... *H04W 12/10* (2013.01); *H04L 63/0428* (2013.01); *H04L 63/123* (2013.01); *H04L 63/162* (2013.01); *H04L 63/164* (2013.01); *H04W 12/00505* (2019.01)

(56) References Cited

U.S. PATENT DOCUMENTS

| | | | | |
|---|---|---|---|---|
| 2011/0016314 | A1* | 1/2011 | Hu | H04L 63/061 713/168 |
| 2011/0041003 | A1* | 2/2011 | Pattar | H04W 12/10 714/4.3 |
| 2011/0269426 | A1* | 11/2011 | Hultin | H04W 12/10 455/411 |
| 2012/0066737 | A1* | 3/2012 | Zhang | H04W 12/02 726/1 |
| 2015/0163678 | A1 | 6/2015 | Zhang et al. | |

OTHER PUBLICATIONS

Musiani, D. et al. Active Sensing Platform for Wireless Structural Health Monitoring. 2007 6th International Symposium on Information Processing in Sensor Networks. https://ieeexplore.ieee.org/stamp/stamp.jsp?tp=&arnumber=4379699 (Year: 2007).*

International Search Report and Written Opinion dated Apr. 13, 2017, corresponding to International Patent Application No. PCT/EP2017/050675.

Jun. 12, 2019 Office Action issued in European Patent Application No. 17700935.4.

Jan. 28, 2020 Communication pursuant to Article 94(3) EPC issued in European Patent Application No. 17700935.4.

Jun. 19, 2020 Office Action issued in Indian Patent Application No. 201817026502 with English translation.

Communication pursuant to Article 94(3) EPC dated Aug. 28, 2020 corresponding to European Patent Application No. 17 700 935.4.

* cited by examiner

FLEXIBLE SELECTION OF SECURITY FEATURES IN MOBILE NETWORKS

CROSS-REFERENCE TO RELATED APPLICATION

This application is related to and claims the benefit and priority of U.S. Provisional Patent Application No. 62/278,801, filed on Jan. 14, 2016, the entirety of which is hereby incorporated herein by reference.

BACKGROUND

Field

Various communication systems may benefit from appropriate security measures. For example, mobile networks may benefit from the flexible selection of security features.

Description of the Related Art

Existing security negotiation mechanisms can be found in the third generation partnership project (3GPP) technical specification (TS) 43.020 for global system for mobile communication (GSM) and general packet radio service (GPRS), in 3GPP TS 33.102 for universal mobile telecommunication system (UMTS), and in 3GPP TS 33.401 for evolved packet system (EPS). Each of 3GPP TS 43.020, 3GPP TS 33.102, and 3GPP TS 33.401 is hereby incorporated herein by reference. The security negotiation mechanisms in these specifications include so-called Ciphering Mode messages or Security Mode messages, respectively. The current agreements on extended coverage GPRS (EC-GPRS) security can be found in 3GPP TR 33.860, v1.0.0, which is also incorporated herein by reference.

The existing security negotiation mechanisms between UE and network have the serving network node (base transceiver station (BTS), serving GPRS support node (SGSN), radio network controller (RNC), evolved node B (eNB), or mobility management entity (MME), for examples) select one algorithm each for ciphering and, in third generation (3G) and fourth generation (4G), integrity. This selection is based on a prioritized list of algorithms supported by the serving node itself and by the algorithms sent by the UE in the UE capabilities. UE is called mobile station (MS) in second generation (2G). No distinction is being made between control plane and user plane.

FIG. 1 illustrates a current state of security negotiation. This is FIG. 6.1.3-1 of 3GPP documents S3b0008 and S3b0013. Message 4 in FIG. 1 shows one cipher algorithm and one integrity algorithm that was selected by the SGSN and is sent back to the MS, in accordance with what is currently specified in 3GPP TS 24.008.

UP integrity in relay nodes is another issue addressed by standards. For relay nodes in EPS, it is stated in 3GPP TS 33.401, clause 7.2.4.1, that "User plane integrity shall be applied to a data radio bearer if integrity protection is configured for that data radio bearer at the time of data radio bearer set-up." This means that UP integrity is not negotiated in a protocol, but configured.

SUMMARY

According to a first embodiment, a method can include receiving an attach request. The method can also include sending a response to the request. The response can include information configured to allow selection of a control plane integrity algorithm independently of a user plane integrity algorithm.

In a variant, the response can include information configured to allow selection of a non-null integrity algorithm for the control plane and a null integrity algorithm for the user plane.

In a variant the information in the response can be configured to identify only one selected integrity algorithm together with an indication of whether the selected integrity algorithm is to be used for both control plane integrity and user plane integrity or for only one of control plane integrity or user plane integrity.

In a variant, the request can include a list of integrity algorithms together with a plurality of identifiers, each identifier indicating for a corresponding integrity algorithm whether the integrity algorithm is to be used for both control plane integrity and user plane integrity or for only one of control plane integrity or user plane integrity.

In a variant, the request can include a list of integrity algorithms together with a single identifier indicating for the list whether the integrity algorithms are to be used for both control plane integrity and user plane integrity or for only one of control plane integrity or user plane integrity.

In a variant, the request can include indicators configured to indicate for control plane and user plane separately and for confidentiality and integrity separately, whether a respective security feature is required from a user equipment perspective.

In a variant, the request can include information regarding integrity algorithm(s) in the "MS network capability" information element of the request.

According to a second embodiment, a method can include receiving a response to an attach request, the response comprising information. The method can also include selecting a control plane integrity algorithm independently of a user plane integrity algorithm based on the information in the response.

The second embodiment may also include the variants of the first embodiment.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Figure 1:
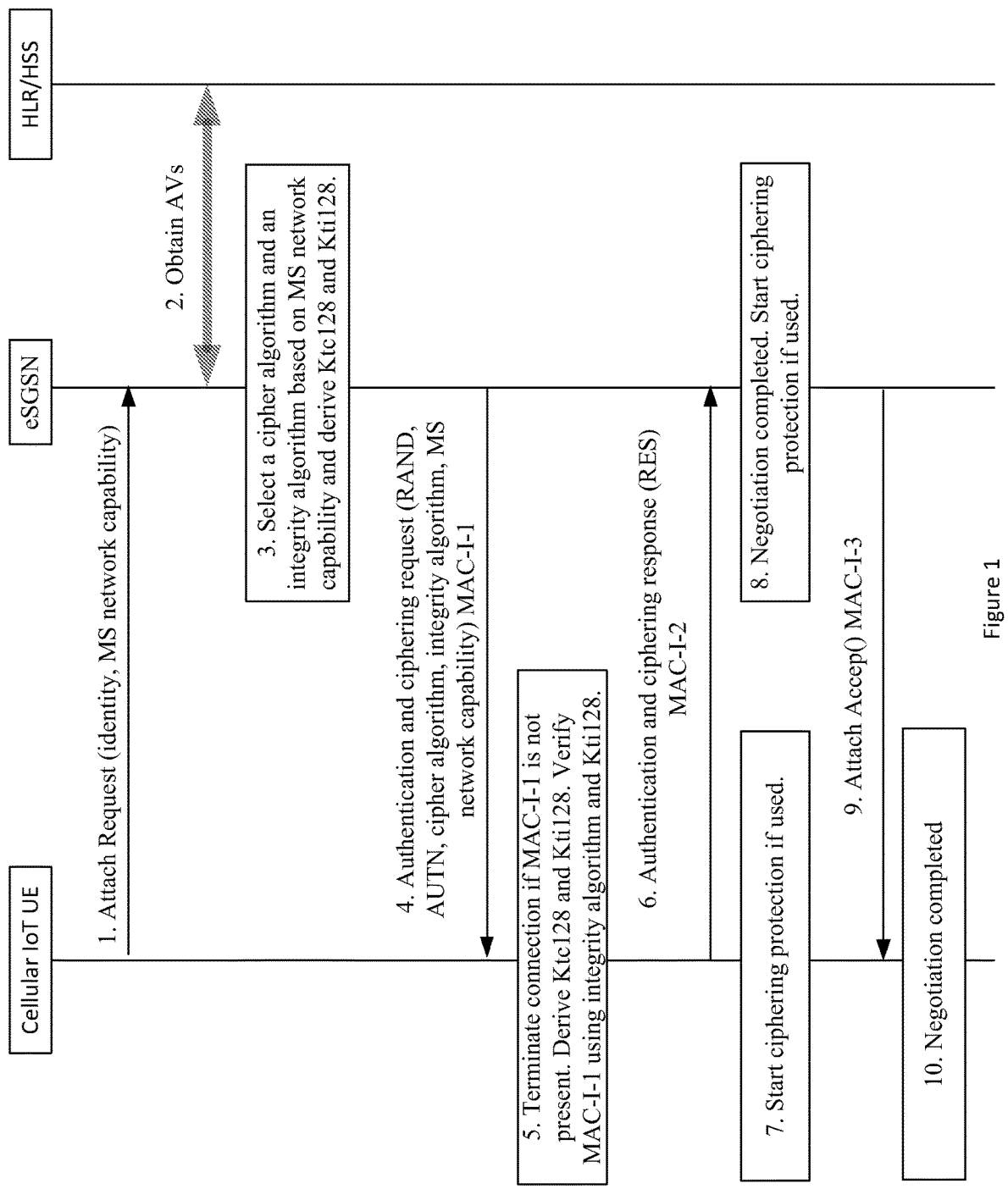
FIG. 1 illustrates a current state of security negotiation.

Certain embodiments relate to security for mobile communication networks. Such security may be of value for GPRS, enhanced for the purposes of the Cellular Internet of Things (CIoT), also known as EC-GPRS. Certain embodiments, however, may also apply to other mobile communication networks as well, such as for 5G security.

Certain embodiments may address the issue of integrity protection of the user plane (UP). No 3GPP-defined network, neither GSM nor GPRS nor UMTS nor EPS, currently provides this security feature for the radio interface extending from the user equipment (UE). UP integrity may be available for data radio bearers between a relay node and a donor eNB.

While neither GSM nor GPRS provide any form of integrity protection, UMTS and EPS do provide integrity protection of the control plane (CP) between UE and serving node.

Certain embodiments may permit selection of security features flexibly, in accordance with the needs of each use case. For example, in one use case, confidentiality and UP integrity protection may not be needed at the network layer if they are provided at the application layer, while CP integrity may still be needed to prevent false base station attacks. In another use case, such as for the IoT, application layer security may not be able to be provided because it may be too expensive in terms of battery-life and the battery of the mobile device may be very constrained. Thus, both confidentiality and integrity may have to be provided for both CP and UP at the network layer. In yet another use case, confidentiality may not be allowed by regulations, CP integrity may be needed, while UP integrity may or may not be desired.

Nevertheless, current security negotiation mechanisms between the UE and the network do not support negotiation of a security feature separately for control plane and user plane. By contrast, certain embodiments may permit activation of CP integrity and UP integrity independently. Thus, it is possible that there may be use cases where there is UP integrity, but not CP integrity, CP integrity alone, or both, CP and UP integrity, although the latter two cases may be more common.

Certain embodiments modify a response sent by a serving node in a security negotiation procedure. For example, according to a first option, the response can be modified in such a way that the response includes information that allows selecting integrity algorithms for the user plane and for the control plane separately. This could also mean that a non-null integrity algorithm is selected for the CP and a null integrity algorithm is selected for the UP. A null integrity algorithm can simply be that no integrity algorithm is selected.

For another example, according to a second option, the response can be modified in such a way that only one selected integrity algorithm is indicated, together with an indication whether the selected integrity algorithm is to be used for both CP and UP, or only for one of CP and UP.

For a further example, according to a third option, the request can be modified in such a way that the UE capabilities or MS capabilities additionally include integrity algorithms supported for the UP and the CP separately. This may also take the form of indicators, one for each integrity algorithm, telling whether the algorithm applies to UP and/or CP or both. Or it may take the form of listing all integrity algorithms supported by the UE or MS together with one indicator telling whether they all apply to the CP only, or the CP and the UP, or the UP only. There may be UEs or MSs that support CP integrity, but not UP integrity, as noted above.

According to a fourth example option, the request can be modified in such a way that the UE capabilities or MS capabilities additionally include indicators that indicate for CP and UP separately, and for confidentiality and integrity separately, whether a given security feature is required from the UE perspective or not. Not all possible indicators need to be present.

While some UEs may abort communication when the network does not provide, for example, CP integrity, in certain environments, where the requirement of CP integrity is implicitly given, the corresponding indicator may not be needed.

Other UEs may indicate support for network layer ciphering algorithms, but may not require confidentiality from the network as confidentiality is provided at the application layer. Such UEs may not mind, however, if the network decided to apply confidentiality.

Thus, in certain embodiments, each of the four above-described options may be present or they may be implemented selectively, either alone or in combination with one or more of the other options.

The following examples illustrate how a subset of the above-described features can be applied to EC-GRPS security. The remainder of the above-described features not applied to EC-GPRS may be useful in 5G security. In 5G implementations, the user equipment may send its capabilities to the network, and the network may select the security features and algorithms.

Figure 2:
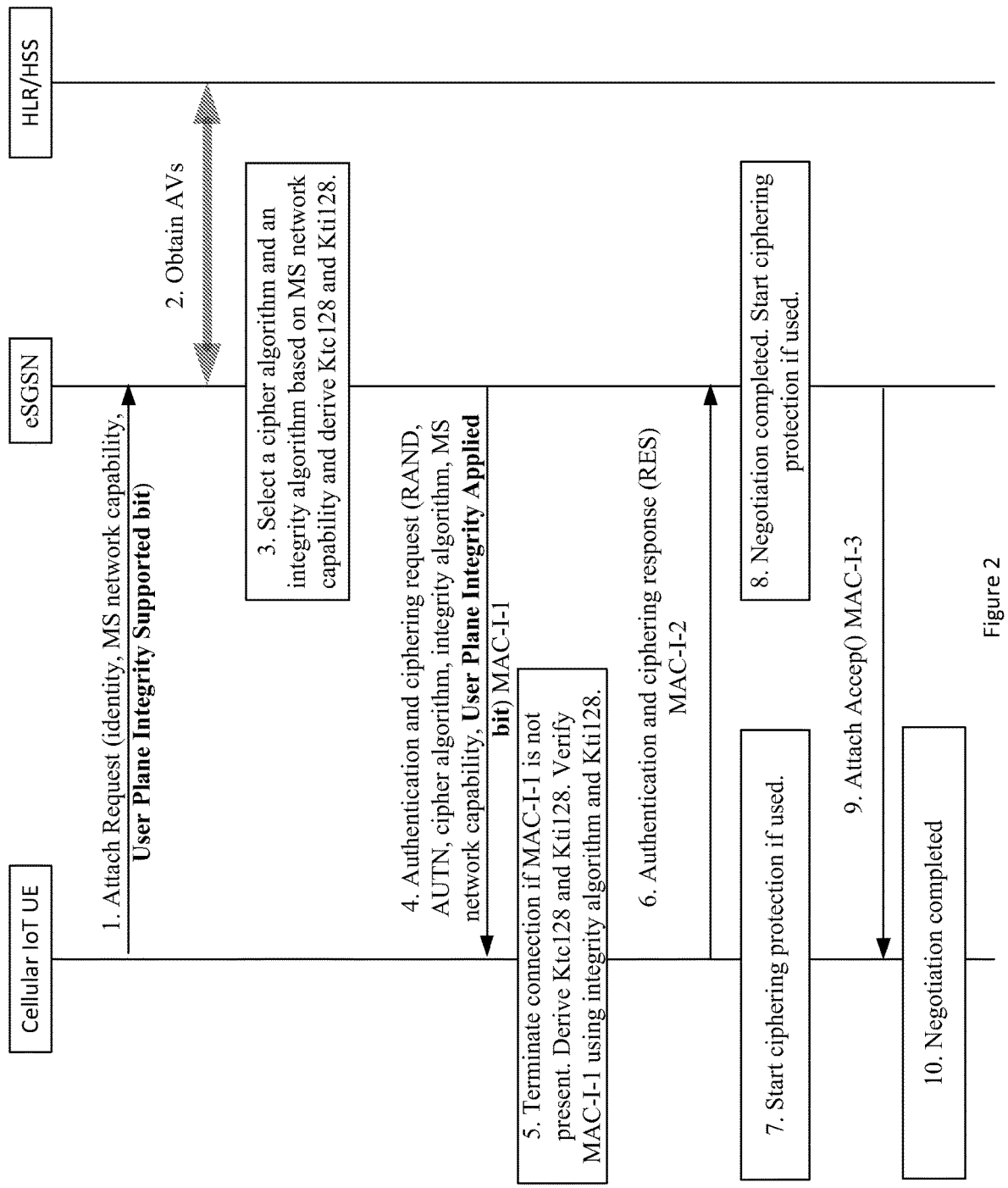
FIG. 2 illustrates security negotiations according to certain embodiments.

FIG. 2 illustrates security negotiations according to certain embodiments. FIG. 2 is based on FIG. 1, discussed above. In this example, two changes may be present. In message 1, "Attach Request (identity, MS network capability)" the "MS network capability" can include an additional bit (shown separately). This additional "User plane Integrity Supported" bit (UIS bit) can have the following meaning: if the UIS bit is set then the MS supports user plane integrity with all the integrity algorithms listed in the MS network capability, otherwise the MS does not support user plane integrity at all. This may implement the third option discussed above.

For EC-GPRS, the MS may not need to indicate whether it requires UP integrity. The network can decide based on other information whether UP integrity is selected, for example based on information in a subscriber profile.

Additionally, message 4, "Authentication and ciphering request (RAND, AUTN, cipher algorithm, integrity algorithm, MS network capability) MAC-I-1," can include an additional bit (shown separately). This additional "User plane Integrity Applied" bit (UIA bit) can have the following meaning: if the UIA bit is set then the eSGSN instructs the MS to apply both CP integrity and UP integrity with the integrity algorithm included in message 4, otherwise only CP integrity is to be applied. This may implement the second option discussed above.

Certain embodiment may provide various benefits and/or advantages. For example, certain embodiments may provide desirable flexibility in the selection of security features by the network. Moreover, certain embodiments may allow more flexible expression of what security features the UE or MS supports and/or requires.

Figure 3:
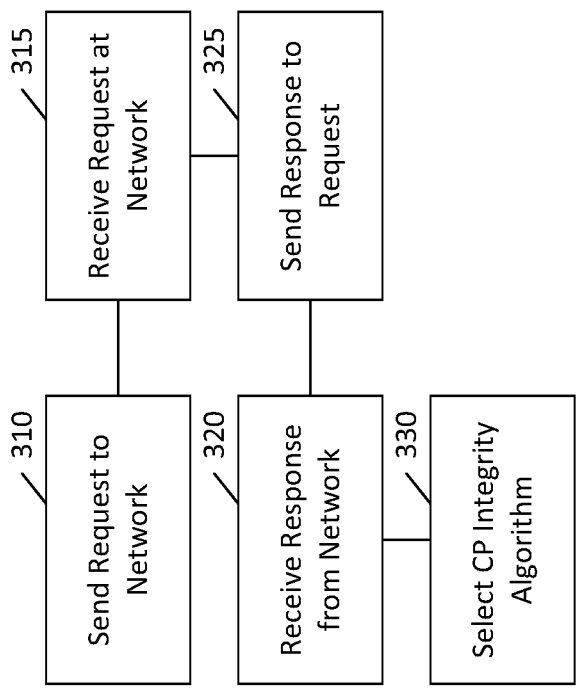
FIG. 3 illustrates a method according to certain embodiments.

FIG. 3 illustrates a method according to certain embodiments. As shown in FIG. 3, a method can include, at 310, sending an attach request by a device such as a user equipment or mobile station. An attach request is one example of a request message that could be sent. Other kinds of request messages are also permitted. The method can further include, at 315, receiving the request at a network element, such as a base transceiver station, SGSN, or evolved Node B.

The method can also include, at 325, sending a response to the request. The response can include information configured to allow selection of a control plane integrity algorithm independently of a user plane integrity algorithm. This situation of allowing selection of a control plane integrity algorithm independently of a user plane integrity algorithm can encompass a variety of situations, including a case in which a non-null integrity algorithm can be selected for the control plane and a null integrity algorithm can be selected for the user plane.

The information in the response can be configured to identify only one selected integrity algorithm together with an indication of whether the selected integrity algorithm is to be used for both control plane integrity and user plane integrity or for only one of control plane integrity or user plane integrity.

Alternatively, or in addition, the request can include algorithm information. For example, the request can include a list of integrity algorithms. The request can include a plurality of identifiers, each identifier indicating for a corresponding integrity algorithm whether the integrity algorithm is to be used for both control plane integrity and user plane integrity or for only one of control plane integrity or user plane integrity. Alternatively, the request can include a single identifier indicating for the list whether the integrity algorithms are to be used for both control plane integrity and user plane integrity or for only one of control plane integrity or user plane integrity.

The request can include indicators configured to indicate for control plane and user plane separately and for confidentiality and integrity separately, whether a respective security feature is required from a user equipment perspective.

The method can also include, at 320, receiving the response to the attach request. The method can further include, at 330, selecting a control plane integrity algorithm independently of a user plane integrity algorithm based on the information in the response.

Figure 4:
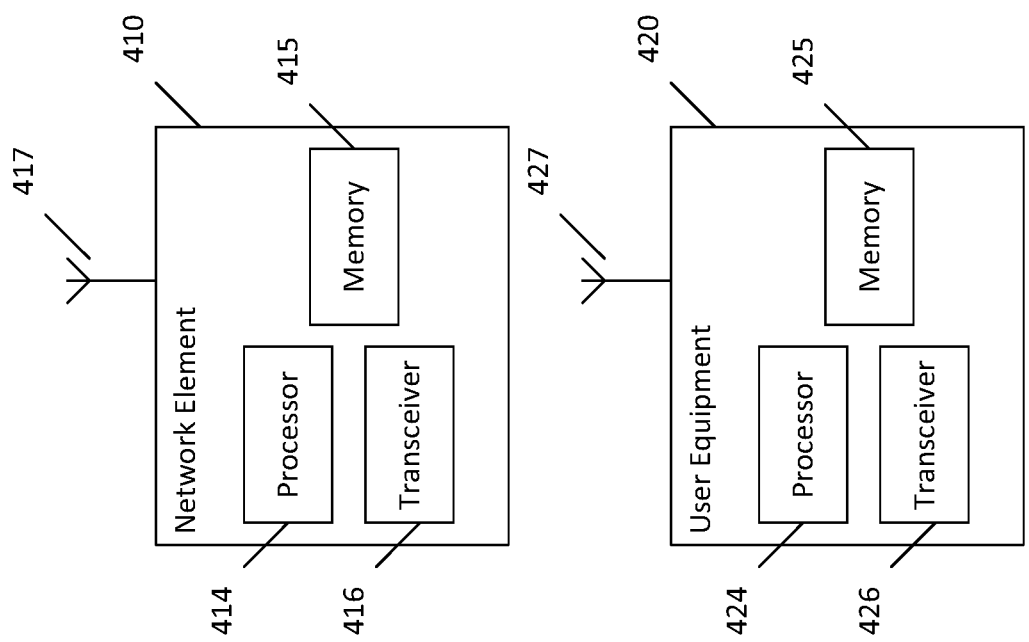
FIG. 4 illustrates a system according to certain embodiments.

FIG. 4 illustrates a system according to certain embodiments of the invention. It should be understood that each block of the flowchart of FIG. 3 may be implemented by various means or their combinations, such as hardware, software, firmware, one or more processors and/or circuitry. In one embodiment, a system may include several devices, such as, for example, network element 410 and user equipment (UE) or user device 420. The system may include more than one UE 420 and more than one network element 410, although only one of each is shown for the purposes of illustration. A network element can be an access point, a base station, an eNode B (eNB), or any other network element, such as an SGSN, MME, BTS, or the like.

Each of these devices may include at least one processor or control unit or module, respectively indicated as 414 and 424. At least one memory may be provided in each device, and indicated as 415 and 425, respectively. The memory may include computer program instructions or computer code contained therein, for example for carrying out the embodiments described above. One or more transceiver 416 and 426 may be provided, and each device may also include an antenna, respectively illustrated as 417 and 427. Although only one antenna each is shown, many antennas and multiple antenna elements may be provided to each of the devices. Other configurations of these devices, for example, may be provided. For example, network element 410 and UE 420 may be additionally configured for wired communication, in addition to wireless communication, and in such a case antennas 417 and 427 may illustrate any form of communication hardware, without being limited to merely an antenna.

Transceivers 416 and 426 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 420 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 420 may be a sensor or smart meter, or other device that may usually be configured for a single location.

In an exemplifying embodiment, an apparatus, such as a node or user device, may include means for carrying out embodiments described above in relation to FIGS. 2 and 3.

Processors 414 and 424 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 415 and 425 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 410 and/or UE 420, to perform any of the processes described above (see, for example, FIGS. 2 and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 4 illustrates a system including a network element 410 and a UE 420, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

CIoT Cellular IoT
CP Control Plane
eSGSN enhanced Serving GPRS Support node
GPRS General Packet Radio Service
MS Mobile Station
SGSN Serving GPRS Support node
UE User Equipment
UP User Plane

I claim:

1. A method, comprising:
  receiving an attach request, wherein the attach request comprises information regarding integrity algorithm(s), in a user equipment network capability information element of the attach request, and an additional user plane integrity supported bit indicating whether the user equipment supports user plane integrity with all integrated algorithm(s) listed in the user equipment network capability information element, or does not support user plane integrity at all; and
  sending a response to the attach request, wherein the response comprises information configured to identify only one selected integrity algorithm and comprises an additional user plane integrity applied bit indicating whether the selected integrity algorithm is to be used for both the control plane integrity and the user plane integrity or only for the control plane integrity, in order to allow selection of a control plane integrity algorithm independently of a user plane integrity algorithm.

2. The method of claim 1, wherein the attach request comprises a list of integrity algorithms together with a plurality of identifiers, each identifier indicating for a corresponding integrity algorithm whether the integrity algorithm is to be used for both control plane integrity and user plane integrity or for only one of control plane integrity or user plane integrity.

3. The method of claim 1, wherein the attach request comprises a list of integrity algorithms together with a single identifier indicating for the list whether the integrity algorithms are to be used for both control plane integrity and user plane integrity or for only one of control plane integrity or user plane integrity.

4. The method of claim 1, wherein the attach request comprises indicators configured to indicate for control plane and user plane separately and for confidentiality and integrity separately, whether a respective security feature is required from a user equipment perspective.

5. A computer program product embodied on a non-transitory computer-readable medium, said product including instructions for performing, when executed in hardware, the method according to claim 1.

6. A method, comprising:
  sending, to a network element, an attach request comprising information regarding integrity algorithm(s), in a user equipment network capability information element of the attach request, and an additional user plane integrity supported bit indicating whether the user equipment supports user plane integrity with all integrated algorithm(s) listed in the user equipment network capability information element, or does not support user plane integrity at all;
  receiving a response to the attach request, from the network element, the response comprising information configured to identify only one selected integrity algorithm and including an additional user plane integrity applied bit indicating whether the selected integrity algorithm is to be used for both the control plane integrity and the user plane integrity or only for the control plane integrity; and
  using the selected integrity algorithm either for both the control plane integrity and the user plane integrity or only for the control plane integrity, and thus selecting a control plane integrity algorithm independently of a user plane integrity algorithm, based on the additional user plane integrity applied bit.

7. The method of claim 6, wherein the attach request comprises a list of integrity algorithms together with a plurality of identifiers, each identifier indicating for a corresponding integrity algorithm whether the integrity algorithm is to be used for both control plane integrity and user plane integrity or for only one of control plane integrity or user plane integrity.

8. The method of claim 6, wherein the attach request comprises a list of integrity algorithms together with a single identifier indicating for the list whether the integrity algorithms are to be used for both control plane integrity and user plane integrity or for only one of control plane integrity or user plane integrity.

9. The method of claim 6, wherein the attach request comprises indicators configured to indicate for control plane and user plane separately and for confidentiality and integrity separately, whether a respective security feature is required from a user equipment perspective.

10. A computer program product embodied on a non-transitory computer-readable medium, said product including instructions for performing, when executed in hardware, the method according to claim 6.

11. An apparatus, comprising:
at least one processor; and
at least one memory including computer program code,
wherein the at least one memory and the computer program code are configured to, with the at least one processor, cause the apparatus at least to
receive an attach request, wherein the attach request comprises information regarding integrity algorithm(s), in a user equipment network capability information element of the attach request, and an additional user plane integrity supported bit indicating whether the user equipment supports user plane integrity with all integrated algorithm(s) listed in the user equipment network capability information element, or does not support user plane integrity at all; and
send a response to the attach request, wherein the response comprises information configured to identify only one selected integrity algorithm and comprises an additional user plane integrity applied bit indicating whether the selected integrity algorithm is to be used for both the control plane integrity and the user plane integrity or only for the control plane integrity, in order to allow selection of a control plane integrity algorithm independently of a user plane integrity algorithm.

12. The apparatus of claim 11, wherein the attach request comprises a list of integrity algorithms together with a plurality of identifiers, each identifier indicating for a corresponding integrity algorithm whether the integrity algorithm is to be used for both control plane integrity and user plane integrity or for only one of control plane integrity or user plane integrity.

13. The apparatus of claim 11, wherein the attach request comprises a list of integrity algorithms together with a single identifier indicating for the list whether the integrity algorithms are to be used for both control plane integrity and user plane integrity or for only one of control plane integrity or user plane integrity.

14. The apparatus of claim 11, wherein the attach request comprises indicators configured to indicate for control plane and user plane separately and for confidentiality and integrity separately, whether a respective security feature is required from a user equipment perspective.

15. An apparatus, comprising:
at least one processor; and
at least one memory including computer program code,
wherein the at least one memory and the computer program code are configured to, with the at least one processor, cause the apparatus at least to
send to a network element an attach request comprising information regarding integrity algorithm(s), in a user equipment network capability information element of the attach request, and an additional user plane integrity supported bit indicating whether the user equipment supports user plane integrity with all integrated algorithm(s) listed in the user equipment network capability information element, or does not support user plane integrity at all;
receive a response to the attach request from the network element, the response comprising information configured to identify only one selected integrity algorithm and including an additional user plane integrity applied bit indicating whether the selected integrity algorithm is to be used for both the control plane integrity and the user plane integrity or only for the control plane integrity; and
use the selected integrity algorithm either for both the control plane integrity and the user plane integrity or only for the control plane integrity, and thus select a control plane integrity algorithm independently of a user plane integrity algorithm, based on the additional user plane integrity applied bit.

16. The apparatus of claim 15, wherein the attach request comprises a list of integrity algorithms together with a plurality of identifiers, each identifier indicating for a corresponding integrity algorithm whether the integrity algorithm is to be used for both control plane integrity and user plane integrity or for only one of control plane integrity or user plane integrity.

17. The apparatus of claim 15, wherein the attach request comprises a list of integrity algorithms together with a single identifier indicating for the list whether the integrity algorithms are to be used for both control plane integrity and user plane integrity or for only one of control plane integrity or user plane integrity.

18. The apparatus of claim 15, wherein the attach request comprises indicators configured to indicate for control plane and user plane separately and for confidentiality and integrity separately, whether a respective security feature is required from a user equipment perspective.

* * * * *